US006467620B1

(12) United States Patent
Heckman et al.

(10) Patent No.: US 6,467,620 B1
(45) Date of Patent: Oct. 22, 2002

(54) CONTAINER HAVING A LABEL APPLIED TO A CURVED PORTION

(75) Inventors: Russell W. Heckman; James A. Herman, both of Perrysburg; Larry P. Shiple; Walter E. Traxler, both of Toledo, all of OH (US)

(73) Assignee: Owens-Brockway Glass Container Inc., Toledo, OH (US)

(*) Notice: Subject to any disclaimer, the term of this patent is extended or adjusted under 35 U.S.C. 154(b) by 0 days.

(21) Appl. No.: 09/923,106

(22) Filed: Aug. 6, 2001

Related U.S. Application Data

(62) Division of application No. 08/693,585, filed on Aug. 7, 1996, now Pat. No. 6,325,879, which is a continuation of application No. 08/006,079, filed on Jan. 19, 1993, now abandoned.

(51) Int. Cl.[7] .......................... B65D 85/00; B32B 31/00

(52) U.S. Cl. ...................... 206/459.5; 156/86; 156/212; 156/215; 156/DIG. 9

(58) Field of Search .............................. 206/459.5, 497; 40/306, 310, 312; 215/230; 156/DIG. 9, 86, 212, 215

(56) References Cited

U.S. PATENT DOCUMENTS 4,416,714 A 11/1983 Hoffmann
4,574,020 A 3/1986 Fosnaught
4,626,455 A 12/1986 Karabedian
4,632,721 A 12/1986 Hoffmann
4,671,836 A 6/1987 Fumei
4,724,029 A 2/1988 Kontz
4,729,811 A 3/1988 DiFrank
4,844,760 A 7/1989 Dickey
4,923,557 A 5/1990 Dickey
5,091,239 A 2/1992 Przeworski et al.
5,403,416 A 4/1995 Bright et al.

FOREIGN PATENT DOCUMENTS

FR 2781074 A1 1/2000 ........... G08C/17/04

*Primary Examiner*—Mickey Yu
*Assistant Examiner*—Jila M. Mohandesi

(57) ABSTRACT

A method of applying a label to a container which includes an intermediate portion of the sidewall thereof which has an annular curved surface wherein the vertical height of the portion having a curved surface is a minor portion of the entire height of the container. A narrow rectangular label of shrinkable material is first provided with one or more longitudinally extending strips of adhesive extending intermediate the longitudinal edges of the label at the area of the label which is to contact the portion of greatest diameter on the curved portion of the container. The strip of adhesive material is shorter than the length of the label so that the adhesive material does not contact the overlapping edges of the label. An adhesive is applied to the trailing edge of the label only and the label is wrapped about the compound curved portion with the adhesive strip engaging the curved portion of the container at the area of greatest diameter. The edges of the label are overlapped and bonded and the overlapped label is then shrunk into position by moving the container and label through an oven. The curved portion of the container may have a compound curvature.

18 Claims, 2 Drawing Sheets

LABEL TRAILING EDGE

LABEL LEADING EDGE

CONTAINER HAVING A LABEL APPLIED TO A CURVED PORTION

This application is a division of application Ser. No. 08/693,585 filed Aug. 7, 1996, now U.S. Pat. No. 6,325,879 dated Dec. 4, 2001, which is a continuation of application Ser. No. 08/006,079 filed Jan. 19, 1993 now abandoned.

This invention relates to applying labels to containers by a wrap and shrink process.

BACKGROUND AND SUMMARY OF THE INVENTION

In the application of labels to containers having curved surfaces, such as carbonated beverage containers of glass or plastic, it has been common to wrap a label of shrinkable material about the generally cylindrical sidewall of a container and then shrink the label about the container. It has also been common to have the label be wrapped about a curved shoulder or heal surface of the container as well as the cylindrical sidewall and then be shrunk thereon. Methods and apparatus have been used wherein adhesives or solvents are applied to the leading edge and trailing edge of the label as shown, for example, in U.S. Pat. Nos. 4,574,020, 4,632,721, 4,671,836, 4,724,029, 4,729,811 and 4,844,760.

However, where the portion of the container to which the label is to be applied is curved and has a narrow vertical height relative to the height of the sidewall, it has been found that it is difficult to wrap the narrow label about the curved portion of the container in an apparatus that handles many containers per minute. The leading and trailing edges tend to overlap in a skewed relationship. The problem is even more acute where the curved portion of the container has a compound curvature and the portion of the container with the greatest diameter is not centrally located with respect to the upper edge and lower edge of label.

Accordingly, among the objectives of the present invention are to provide a method of applying a narrow shrinkable label by wrapping the label about a curved portion of a container and holding the label for sufficient time to permit shrinking the narrow label into conformity with the curved portion; wherein the container may have a compound curved portion and which method provides a uniform shrinkage about the compound curved portion with the upper and lower edges of the narrow label being in conformity thereto.

In accordance with the invention a method is provided for applying a label to a container which includes an intermediate curved portion of the sidewall thereof, which may have a compound curvature, wherein the vertical height of the curved portion is a minor portion of the entire height of the container. A narrow rectangular label of shrinkable material is first provided with a continuous or interrupted longitudinally extending strip of adhesive extending intermediate the longitudinal edges of the label at the area of the label which is to contact the portion of greatest diameter on the curved portion of the container. The strip of adhesive material is shorter than the length of the label so that the adhesive material does not contact the overlapping edges of the label. The label is wrapped about the compound curved portion with the adhesive strip engaging the curved portion of the container at the area of greatest diameter. The edges are overlapped and bonded and the overlapped label is then shrunk into position by moving the container and label through an oven. The bonding of the edges may be by adhesive, solvent or heat sealing. If adhesive or solvent is used as a bonding agent, it is applied to the only trailing edge of the label.

DESCRIPTION

Figure 1:
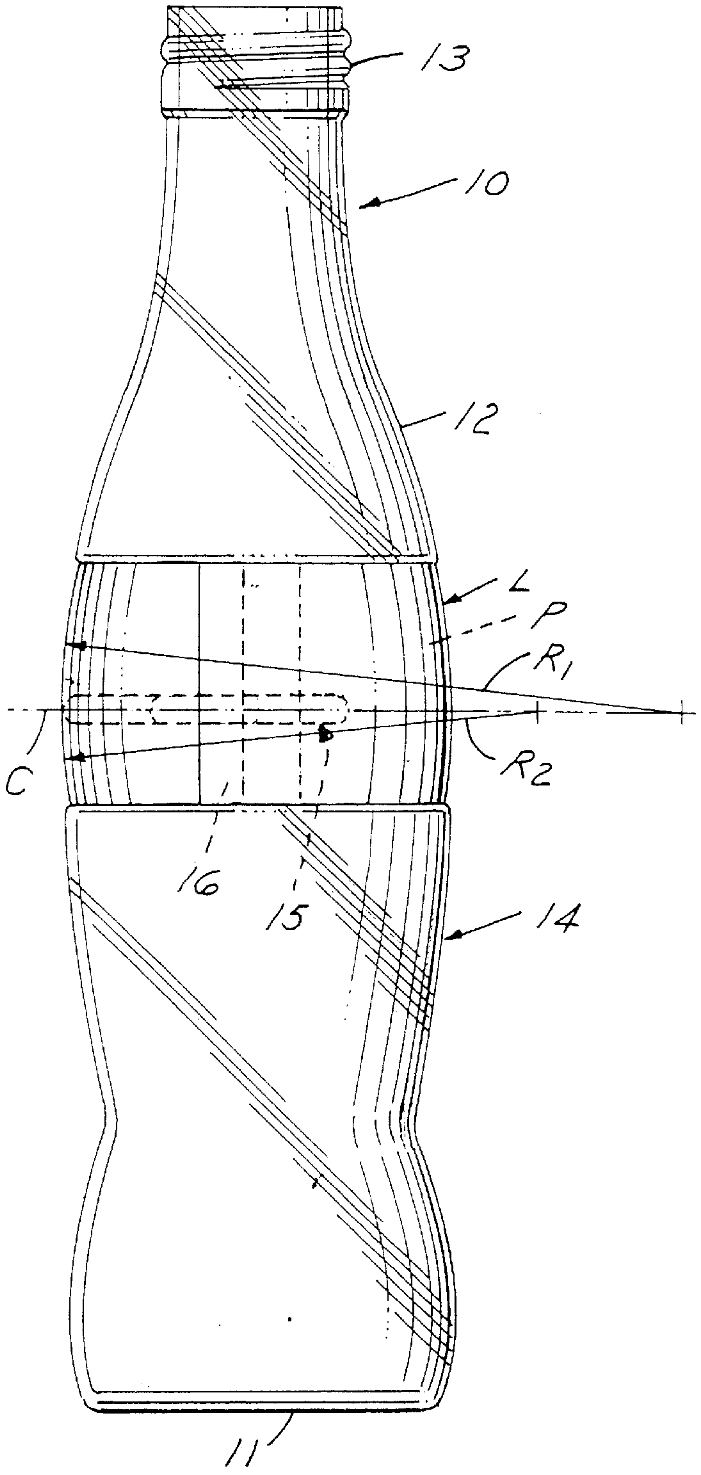
FIG. 1 is an elevational view of a container embodying the invention.
Figure 2:
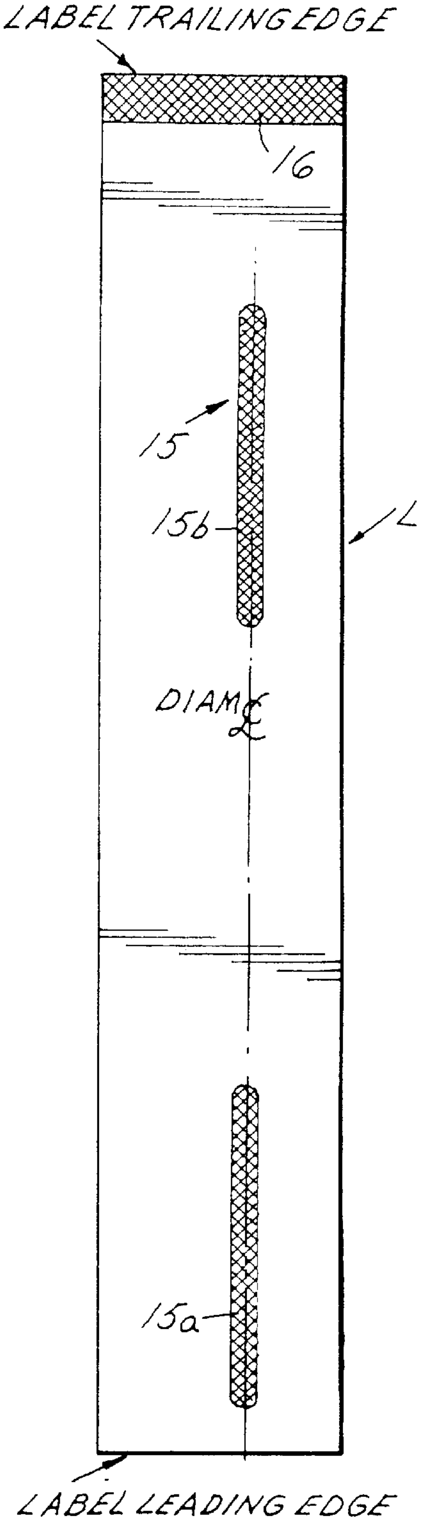
FIG. 2 is a plan view of a label taken from the side which is positioned adjacent the container.
Figure 3:
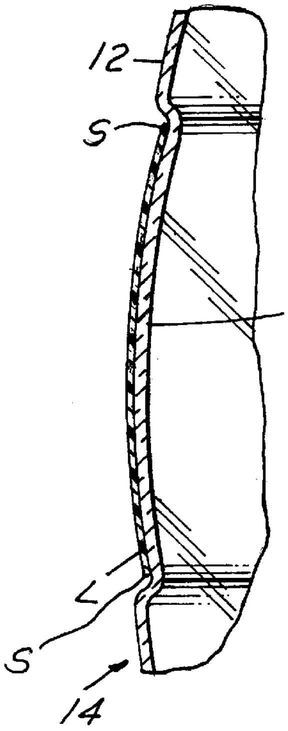
FIG. 3 is a vertical sectional view of a portion of the container in FIG. 1.

Referring to FIGS. 1–3, as shown in FIG. 1, the container 10 is made of glass or plastic and includes a base 11, a shoulder 12, a neck or finish 13 and a sidewall 14 which is threaded for receiving a closure, as where the container is used to hold carbonated beverages or liquids. A narrow rectangular label L is shrunk about an annular recessed portion P of the container which is intermediate adjacent the shoulder and the upper edge of the sidewall. The curved portion P is shown as having a compound curvature wherein one radius $R_1$, has a different radius and center than the other radius $R_2$. As a result the centerline C of the compound curved portion P having the greatest diameter is not at the axial midpoint of portion P. As shown radius $R_2$ is shorter than radius $R_1$ and has its center on centerline C that is spaced from the axial midpoint of the portion P such that the portion of the curved portion P of the container having the greatest diameter is spaced axially below the axial midpoint of portion P. As shown, the vertical height of the recessed portion P of the container is a minor portion of the height of the sidewall of the container 10.

Figure 4:
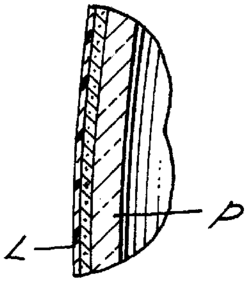
FIG. 4 is a fragmentary sectional view on an enlarged scale of a portion of the wall of the container.
Figure 5:
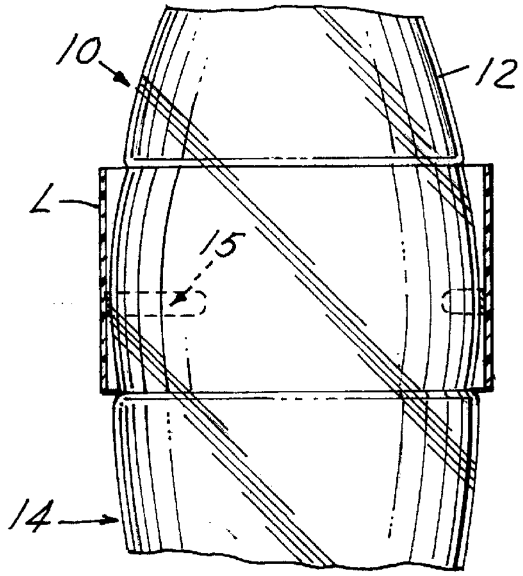
FIG. 5 is a fragmentary elevational view of a portion of the container after the label has been wrapped about the container and before it has been shrunk on the container.
Figure 6:
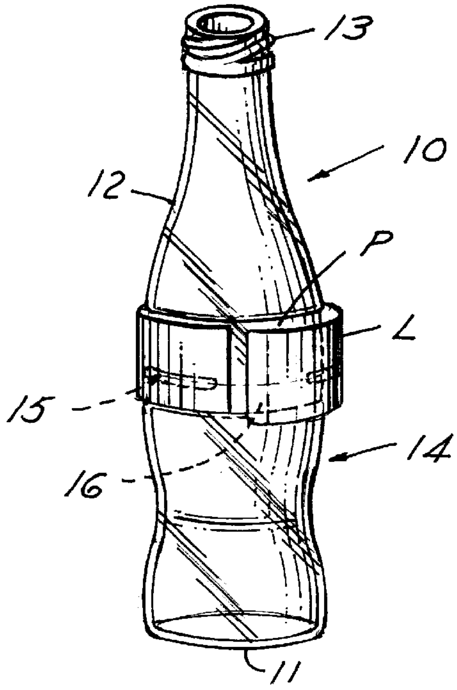
FIG. 6 is a perspective view of the container with the label partially wrapped about the container.

As shown in FIGS. 3–5, the label L which is generally rectangular and has a width substantially equal to the vertical height of the recessed compound curved portion P is provided with a hot adhesive in a narrow longitudinally extending strip 15 that is at the line C of greatest diameter of compound curved portion P. As shown in FIG. 2, preferably the strip is interrupted with portion **15*a* spaced from the leading edge and a portion 15*b* aligned with portion 15*a* and spaced from the trailing edge a greater distance than the portion 15*a*** is spaced from the leading edge.

As the label L is first wrapped around the container 10, the adhesive line 15 is aligned with and engages the portion of greatest diameter of the compound curvature. The leading and trailing edges are then overlapped and bonded to one another as by using adhesive, solvent or heat sealing. As shown in FIG. 2, an additional line 16 of adhesive or solvent is applied only at the trailing edge of the label L. As shown in FIG. 5, adhesive strip 15 is applied and the edges are overlapped and bonded to hold the label L in position at least long enough for the container and the label L to be wrapped around the container. The leading and trailing edges are overlapped and the container, with the label L applied thereto. The container with the label applied is moved through an oven to shrink the label into conformity with the compound curved portion P of the container so that the side edges S are at the axial extremities of the recessed compound curved portion P.

The strip of adhesive is preferably applied by a spray gun spaced from the label so that as the label moves past the spray gun, a line of adhesive is applied.

As used herein, the term adhesive is intended to cover any bonding agent that will hold the label in position as it is wrapped until the leading and trailing edges are overlapped and the container, with the label applied thereto, is moved through an oven to shrink the label into conformity with the compound curved portion P of the container such that the side edges of the label are at the axial extremities of the compound curved portion P.

The label L may be made of any shrinkable material such as plastic including multilayer labels comprising a foam layer and a non-foam layer such as shown, for example, in U.S. Pat. No. 4,626,455 incorporated herein by reference.

A satisfactory apparatus which can be used with the addition of a spray mechanism and the elimination of application of any bonding agent to the leading edge such as shown in U.S. Pat. No. 4,729,811, incorporated herein by reference.

It can thus be seen that there has been provided a method of applying a narrow label by wrapping the label about a curved portion of the container and holding the label for sufficient time to permit shrinking the narrow label into conformity with the curved portion; wherein the container may have a compound curved portion; and which method provides a uniform shrinkage about the compound curved portion with the upper and lower edges of the narrow label being in conformity thereto.

What is claimed is:

1. A package that comprises: a container that includes a sidewall, an intermediate portion of the sidewall having a continuous curvature in an axial direction wherein the axial height of the curved portion is a portion of the entire height of the sidewall of the container, said curved portion having an upper end and a lower end, said curved portion having a portion of greatest diameter transverse to the axial height of the curved portion of said container, said portion of greatest diameter being spaced from the upper end and the lower end of said curved portion, said curved portion of said container having a compound continuous curvature comprising portions having differing radii such that the curved portion of the container has a greatest diameter spaced from a transverse centerline of the curved portion, a rectangular label of shrinkable material having a leading edge, a trailing edge and spaced upper and lower longitudinal edges, said rectangular label having a width between said longitudinal edges, a strip of bonding material extending longitudinally of said strip along a line intermediate the upper and lower longitudinal edges of said label spaced from a longitudinal centerline of the label substantially the same distance as the portion of greatest diameter of the container is spaced from the centerline of the curved portion of the container at the area of the label which is to contact the portion of greatest diameter on the curved portion of the container, and such that said strip of bonding material is spaced from the leading and trailing edges of the label such that it does not contact the leading and trailing edges of the labels, the label being wrapped about the curved portion of the container with the bonding material engaging the container at the portion of greatest diameter of the curved portion, the leading and trailing edges of the label being overlapped and bonded to each other, the overlapped label being heat-shrunk into position on the curved portion of the container.

2. The package set forth in claim 1 wherein said strip of bonding material is interrupted.

3. The package set forth in claim 1 wherein said compound curved portion of the container has two radii, the centers of which are spaced from one another.

4. The package set forth in claim 1 wherein said strip of bonding material applied between the leading and trailing edges of the label comprises a hot melt adhesive.

5. The package set forth in claim 1 wherein said overlapped edges are bonded by a bonding material selected from the group consisting of hot melt adhesives and solvents.

6. The package set forth in claim 1 wherein said overlapped leading and trailing edges of said label are heat sealed to each other.

7. The package set forth in claim 1 wherein said container is a glass container.

8. The package set forth in claim 1 wherein said container comprises a plastic container.

9. The package set forth in claim 1 wherein said curved portion of said container to which said label is applied comprises a recessed portion of the container which has upper and lower edges, and wherein said label is wrapped between said upper and lower edges of said recessed portion.

10. The package set forth in claim 9 wherein the vertical height of said curved portion of said container is a minor portion of the vertical height of the sidewall of the container, and the width of the label is substantially equal to the vertical height of the curved portion.

11. A package comprising:

a container which includes a sidewall having an intermediate portion with a curvature, wherein the height of the curved intermediate portion is less than the entire height of the container, said curved intermediate portion of said container having a compound curvature with a portion of greatest diameter spaced from a midpoint of the vertical height of said curved portion, a rectangular label of shrinkable material having a leading edge and a trailing edge, said label having a strip of bonding material along a longitudinally extending line extending intermediate the longitudinal edges of the label at the area of the label in contact with said portion of greatest diameter on the curved intermediate portion of the container, said strip of bonding material being spaced from the leading and trailing edges of the label such that it does not contact the leading and trailing edges of the label, said label being wrapped about said curved intermediate portion with the bonding material engaging the container at the portion of said curved intermediate portion of greatest diameter, said leading and trailing edges of said label being overlapped and bonded to one another, and said overlapped label being shrunk about said curved intermediate portion.

12. The package set forth in claim 11 wherein said strip of bonding material is interrupted.

13. The package set forth in claim 11 wherein the strip of bonding material applied between the leading and trailing edges of the label comprises a hot melt adhesive.

14. The package set forth in claim 11 wherein the leading and trailing edges are bonded by hot melt adhesive, solvent or heat sealing.

15. The package set forth in claim 11 wherein said container is a glass container.

16. The package set forth in claim 11 wherein said container comprises a plastic container.

17. The package set forth in claim 1 1 wherein said curved intermediate portion of said container is recessed between its upper and lower edges.

18. The package set forth in claim 11 wherein the vertical height of said curved intermediate portion is a minor portion of the vertical height of the sidewall of the container, and the width of the label is substantially equal to the vertical height of the curved portion.

* * * * *